US012618391B2

(12) United States Patent
Memmel et al.

(10) Patent No.: US 12,618,391 B2
(45) Date of Patent: May 5, 2026

(54) UNDERWATER FLOW TURBINE

(71) Applicant: AKTIEBOLAGET SKF, Gothenburg (SE)

(72) Inventors: Marcel Alfred Memmel, Ebenhausen (DE); Michael Baumann, Gädheim (DE); Jochen Kuhstrebe, Biebelried (DE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 18/779,421

(22) Filed: Jul. 22, 2024

(65) Prior Publication Data

US 2025/0043762 A1     Feb. 6, 2025

(30) Foreign Application Priority Data

Aug. 1, 2023     (DE) .......................... 102023207338.2

(51) Int. Cl.
| | |
|---|---|
| *F03B 11/00* | (2006.01) |
| *F03B 13/10* | (2006.01) |
| *F03B 13/26* | (2006.01) |
| *F04D 27/00* | (2006.01) |
| *H02K 9/26* | (2006.01) |

(52) U.S. Cl.
CPC ........... *F03B 11/008* (2013.01); *F03B 13/10* (2013.01); *F03B 13/264* (2013.01); *F04D 27/008* (2013.01); *H02K 9/26* (2013.01); *F05B 2240/14* (2013.01); *F05B 2260/64* (2013.01); *F05B 2270/30* (2013.01)

(58) Field of Classification Search
CPC ......... H02K 9/26; F03B 11/008; F03B 13/10; F03B 13/264; F03B 17/061; F04D 27/008; F05B 2240/14; F05B 2260/64; F05B 2270/30
See application file for complete search history.

(56) References Cited

U.S. PATENT DOCUMENTS

| | | | |
|---|---|---|---|
| 3,936,681 A | 2/1976 | Liebe | |
| 4,445,046 A * | 4/1984 | Allegre | F03B 13/105 |
| | | | 290/43 |
| 8,109,814 B2 * | 2/2012 | Uchino | F03D 80/60 |
| | | | 290/55 |
| 10,359,028 B2 * | 7/2019 | Ma | H02K 9/26 |

(Continued)

FOREIGN PATENT DOCUMENTS

| | | |
|---|---|---|
| CN | 112994354 A | 6/2021 |
| FR | 1267170 A | 7/1961 |

OTHER PUBLICATIONS

European Search Report from the European Patent Office dispatched Dec. 16, 2024 in related application No. EP 24 19 1798, including European Search Opinion, and machine translation thereof.

*Primary Examiner* — Andrew J Marien
(74) *Attorney, Agent, or Firm* — J-TEK LAW PLLC; Scott T. Wakeman; Mark A. Ussai

(57) ABSTRACT

An underwater flow turbine includes a gondola having an interior, a generator in the gondola interior, a rotatable hub connected to the gondola and configured to support a plurality of rotor blades, the rotatable hub being operatively connected to the generator, and an air handling device, such as a fan or an air filtration system, in the gondola and/or in the hub.

18 Claims, 4 Drawing Sheets

(56)                    References Cited

U.S. PATENT DOCUMENTS

| | | | | |
|---|---|---|---|---|
| 10,677,226 B2 * | 6/2020 | Soerensen | .............. | H02K 5/207 |
| 11,146,143 B2 | 10/2021 | Groenheden | | |
| 2010/0140952 A1 * | 6/2010 | Jansen | ..................... | H02K 9/14 |
| | | | | 290/55 |
| 2014/0117794 A1 * | 5/2014 | Zirin | ...................... | H02K 9/197 |
| | | | | 165/173 |
| 2014/0346781 A1 * | 11/2014 | Airoldi | ................... | H02K 7/18 |
| | | | | 290/55 |
| 2015/0108756 A1 * | 4/2015 | Li | ........................... | H02K 9/04 |
| | | | | 290/55 |
| 2019/0140518 A1 * | 5/2019 | Groenheden | ............ | H02K 9/04 |

* cited by examiner

UNDERWATER FLOW TURBINE

CROSS-REFERENCE

This application claims priority to German patent application no. 10 2023 207 338.2 filed on Aug. 1, 2023, the contents of which are fully incorporated herein by reference.

TECHNOLOGICAL FIELD

The present disclosure is directed to a flow turbine, in particular an underwater flow turbine, having an air handling system such as a ventilation device and/or a filtration device.

BACKGROUND

A flow turbine, regardless of whether for wind power or underwater use, usually comprises a gondola, in which the actual power-producing generator is accommodated, and a hub rotatably fastened to the gondola, to which the rotor blades are fastened and which is rotated with the aid of the rotor blades and which drives the generator. Both the hub and the gondola have hollow interior spaces that are accessible for service personnel via access (maintenance) hatches and, in addition to the generator, comprise a plurality of other components necessary for the operation of the flow turbine, all of which components must be maintained regularly.

Flow turbines, in particular underwater flow turbines such as tidal turbines, usually operate underwater, so all the spaces filled with air are sealed off in an airtight manner. During the operation of the turbine, however, toxic gases, moisture, oil vapor and salt-containing air are produced in particular in the gondola and the hub, and this can have a detrimental effect on the sensitive components such as electronics (slip rings or similar parts) and can cause unplanned outages. Furthermore, the air-gas mixture these produce must be replaced before the entry of maintenance personnel into the gondola or into the hub for maintenance work so as not to endanger the maintenance personnel with regard to health and safety.

For this purpose, the maintenance hatch is usually opened for a long time before maintenance personnel enter to ensure that any toxic fumes have evaporated and/or dissipated. Sometimes, following the opening of the maintenance hatch, a blower is also introduced into the gondola or into the hub for this purpose, removing the toxic air from the interior of the gondola or hub.

Although this permits risk-free access by the maintenance personnel after some time, it does not prevent damage to sensitive components exposed to the toxic fumes.

SUMMARY

It is therefore an aspect of the present disclosure to provide a flow turbine, in particular an underwater turbine, in which sensitive components in an interior of a turbine housing are protected against toxic gases during operation. At the same time, access for maintenance purposes can be provided more easily and more quickly than before which reduces the required stoppage time of the turbine.

In the following, a flow turbine, in particular an underwater flow turbine for a tidal power plant, is presented. The flow turbine comprises a gondola, in which a generator for producing power is accommodated, and a rotatable hub connected to the gondola, to which rotor blades can be fastened and which is designed to drive the generator.

In order to protect the sensitive components from the damaging influences of toxic gases which can be produced during operation, and to ensure that maintenance personnel can enter the interior of the gondola and/or hub at any time, the interior of the gondola and/or the hub is provided with a ventilation system having at least one air handling device such as a ventilation device and/or an air filtration device.

According to a further advantageous exemplary embodiment, the at least one air handling device has at least one inlet opening, via which a medium, in particular air, which is located in the gondola and/or the hub, enters the air handling device. The medium is usually air or, during the operation of the gondola, also air which can include toxic gases, moisture, oil vapor or a salt content. In the worst case, the entire composition of the air can consist of toxic gases and foreign constituents. Furthermore, the air handling device has an outlet opening, through which the medium that has entered the air handling device can leave the air handling device. For example, an air filter, which cleans the air-gas mixture of damaging components, can be provided in the interior of the air handling device. Alternatively, sensors which determine a condition of the air that has entered the air handling device can also be provided in the interior.

Furthermore, it is advantageous if the air handling device has at least one suction element, in particular a fan or a blower, which is designed to suck or to blow the medium which is located in the gondola and/or the hub through the air handling device. This makes it possible to ensure for the medium which is present in the gondola or in the hub to be actively drawn into the interior of the air handling device and expelled from the outlet opening.

Preferably, the outlet opening is arranged in the vicinity of a maintenance hatch so that the used air can be sucked specifically out of the gondola or the hub and replaced by fresh air, which preferably flows automatically through the maintenance hatch.

Thus, for example, only one fan can be fitted in the interior of the gondola or hub, which purposefully conveys air from the interior of the gondola or hub into the surrounding environment through the maintenance opening. Here, too, an exchange of air is achieved via fresh air flowing in.

According to a further advantageous exemplary embodiment, a conduit can be laid between the intake point (inlet opening) and the outlet opening so that air from locations which are particularly susceptible to contamination can be guided to the maintenance hatch or an air cleaning element. The air handling device can also have a plurality of inlet openings, which are connected via conduits to a centrally functioning suction element, which in turn discharges the air at a specific outlet opening via a central outlet line.

Furthermore, provision can be made that, during maintenance on the conduit, a sensor device which checks the condition of the air can be connected, in particular to the outlet opening. Furthermore, it is possible to fasten further conduit elements to the outlet opening, in order specifically not only to transfer air in the region of the maintenance hatch but to liberate it specifically at other points far removed from the maintenance hatch. This is advantageous in particular in the case of air constituents that are damaging to health.

In order not to pollute the environment impermissibly, during maintenance processes an air cleaning device can of course also be connected to the conduit or the outlet opening, or the air from the outlet opening can be led in the direction of an air cleaning system by means of an appropriate conduit.

To connect the various components, corresponding connecting elements can be provided at the outlet opening.

In order to ensure a non-toxic environment even when the maintenance hatch is closed and during continuous operation so that sensitive components, such as slip rings, are not damaged, for example oxidized, it is further provided that the ventilation system includes an air filter. As mentioned above, such air filtering can be arranged in the interior of the air handling device. However, it is also possible that there is a passively operated air filter in the interior of the gondola and/or hub so that it is possible to dispense with a separate suction or blower element.

However, in order to increase the efficiency of the air cleaning, a combination of air cleaning and active air transport is also preferred in this case so that the air present in the gondola or hub is also cleaned of pollutants, such as oil vapor or a high salt content, during operation. This increases the service life of the sensitive components and permits greater maintenance intervals which, in particular in underwater uses, would lead to not inconsiderable problems and outage times.

The filtration device can be a chemically and/or mechanically operating air filter, such as a particle filter.

According to a further advantageous exemplary embodiment, the ventilation system also has at least one sensor device. As already mentioned above, the sensor device can be integrated directly in the air handling device but it is also possible to position the sensor device at strategically important positions within the gondola or the hub. As a result, in particular at locations which are susceptible to high-level contamination, it is possible to carry out measurements which can provide information about the condition of the medium, in particular the air, that is present in the gondola or the hub.

The sensor device is preferably designed to determine at least one condition or a condition variable of the medium present in the gondola and/or the hub. In particular, the sensor device is designed to detect one or more constituents of a medium present in the gondola and/or the hub or, overall, to analyze a composition of the medium. Furthermore, the sensor device can be equipped with a transmitting and receiving unit, with which the information about the condition of the medium in the hub or gondola can be output. An external maintenance person or else a control device for the air handling device can serve as a receiver of this information. Depending on the condition of the medium detected by the sensor device, the maintenance person or the control device can then decide whether air cleaning is necessary and/or has been carried out adequately.

It is in particular further advantageous if the ventilation system likewise includes a control unit, such as a control device, and/or a transceiver, wherein the transceiver is designed to transmit and/or to receive a signal, and the control unit is designed to activate and deactivate the air handling device on the basis of the received signal. The received signal can be output directly by the sensor device but it is also possible that the received signal is transmitted to the control device by an external operator. It is likewise possible that the sensor device transmits a signal to an external maintenance person and the maintenance person then activates the air handling device. Furthermore, it is likewise possible that a signal which activates the measurement or analysis of the medium is transmitted to the sensor unit from outside. It is likewise possible, for example, that in the event of maintenance, the air handling device is activated first and only after a certain period of time is the sensor device activated, in order to detect whether safe access for a maintenance person is possible.

Furthermore, it is advantageous if the sensor device is designed to output a signal to the control device or an external operator only when the result of the analysis of the condition of the air/the medium is that cleaning or ventilation is necessary. Of course, such an analysis can also be performed by other control elements and only the raw data about the condition of the air is transmitted via the signal.

Further advantages and advantageous embodiments are specified in the description, the drawings and the claims. In particular, the combinations of features specified in the description and in the drawings are purely exemplary so that the features can also be present individually or combined in other ways.

BRIEF DESCRIPTION OF THE DRAWINGS

The invention is described in more detail below with reference to exemplary embodiments illustrated in the drawings. The exemplary embodiments and the combinations shown in the exemplary embodiments are purely exemplary and are not intended to define the scope of protection of the invention. This is defined solely by the dependent claims.

FIG. 1 is a schematic illustration of an underwater turbine.

DETAILED DESCRIPTION

In the following, the same or functionally identical elements are identified by the same reference symbols.

Figure 2A:
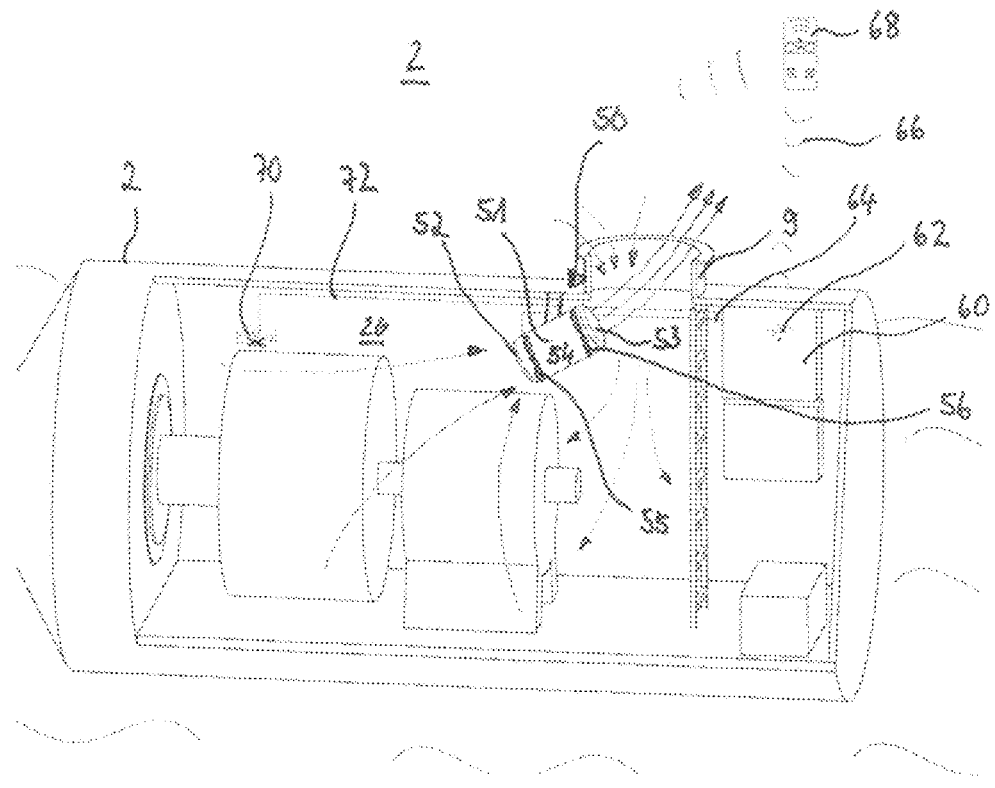
FIG. 2A is a schematic illustration of a first exemplary embodiment of a ventilation system for an underwater turbine in a gondola.
Figure 2B:
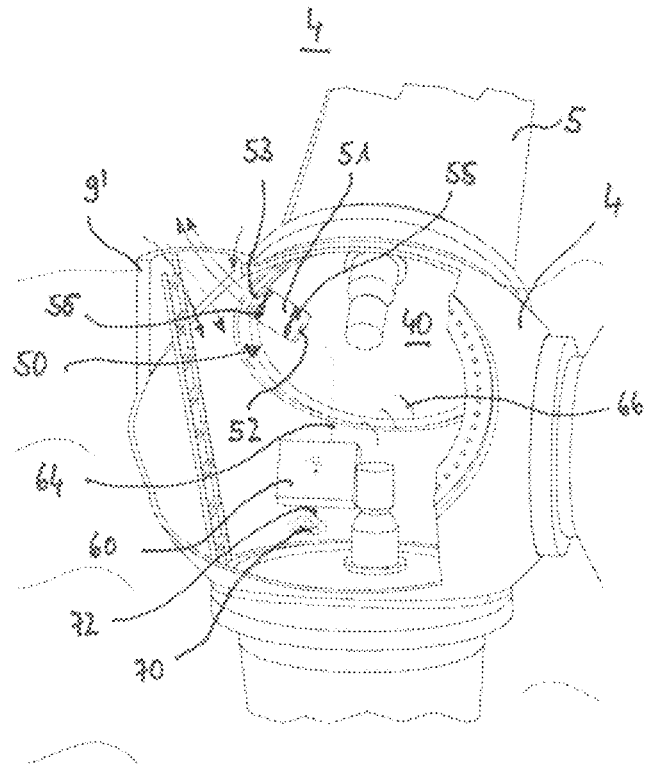
FIG. 2B is a schematic illustration of the first exemplary embodiment of a ventilation system for an underwater turbine in a hub.
Figure 3A:
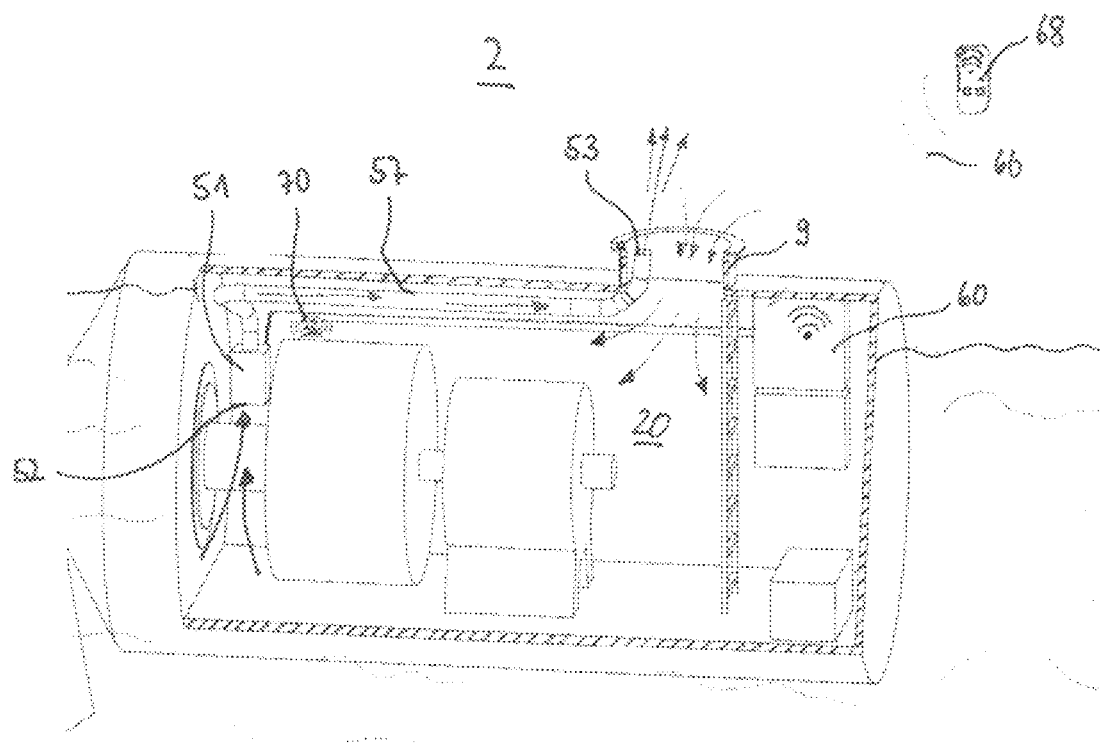
FIG. 3A is a schematic illustration of a second exemplary embodiment of a ventilation system for an underwater turbine in a gondola.
Figure 3B:
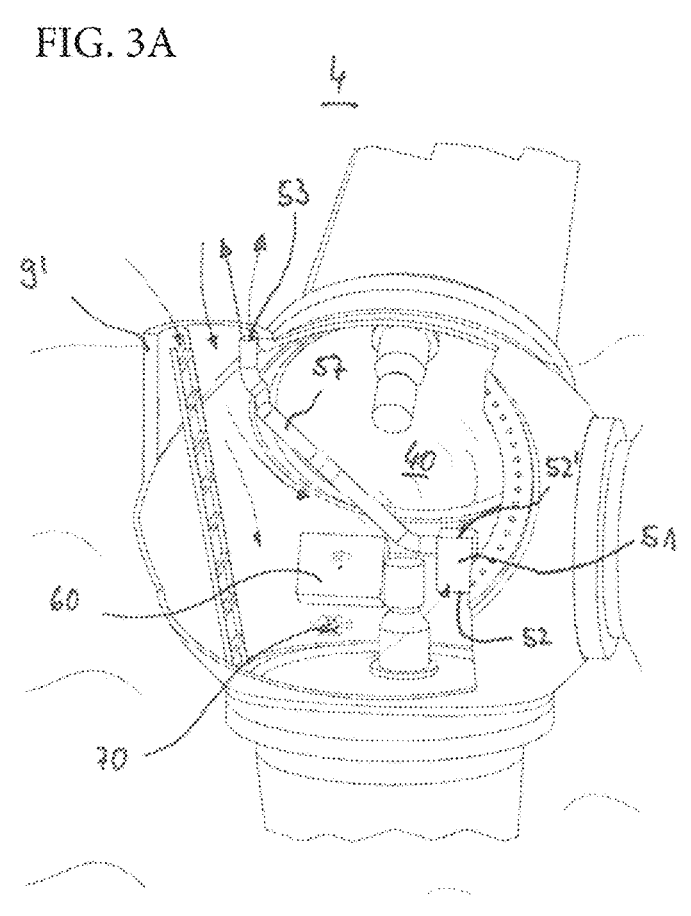
FIG. 3B is a schematic illustration of the second exemplary embodiment of a ventilation system for an underwater turbine in a hub.
Figure 4A:
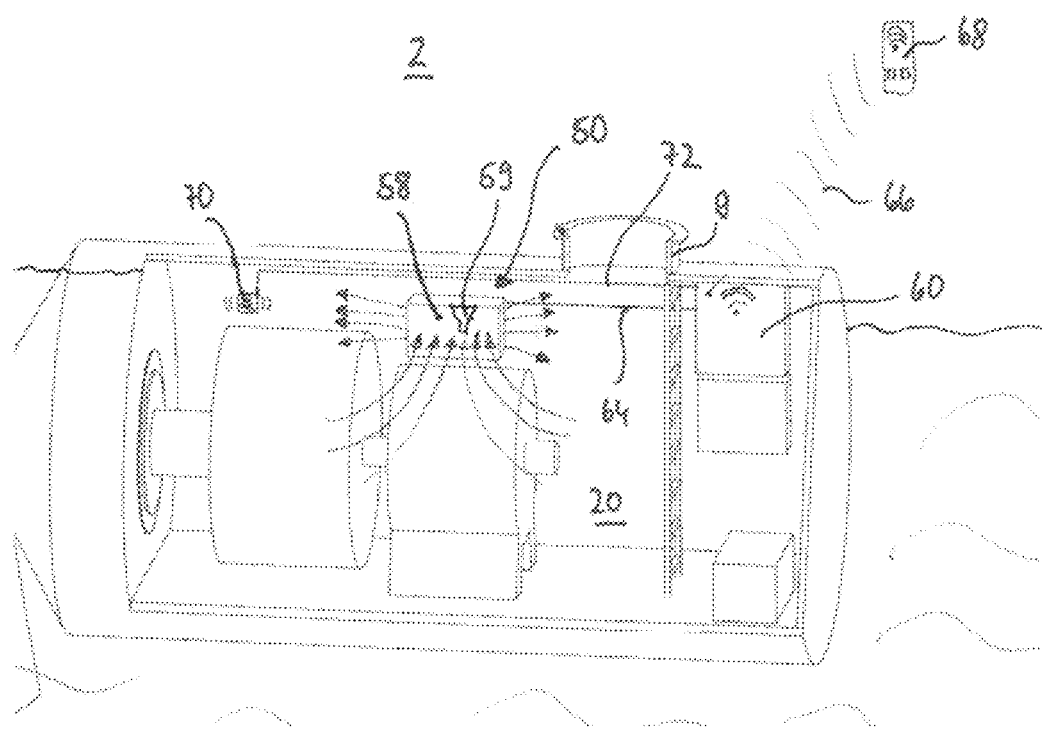
FIG. 4A is a schematic illustration of a third exemplary embodiment of a ventilation system for an underwater turbine in a gondola.

FIG. 1 shows an underwater turbine schematically in a partially sectional view, and FIGS. 2 to 4 show various exemplary embodiments of various ventilation systems in a gondola (partial figures A) and a hub (partial figures B). FIGS. 2A, 3A, 4A show the respective exemplary embodiment for the gondola, while the exemplary embodiments 2B, 3B, 4B illustrate the respective exemplary embodiments for the hub.

As can be gathered from FIG. 1, flow turbines 1 or underwater turbines, in particular for tidal power plants, usually comprise a gondola 2 having a generator 3 in the interior 20 of the gondola for producing power and a hub 4 rotatably fastened to the gondola 2 and supporting rotor blades 5. The hub 4 itself is also hollow and has an interior 40. The rotor blades 5 are driven by the flow so that the hub 4 is caused to rotate. The rotation of the hub 4 produced by the rotor blades 5 is fed via a shaft 6 into the gondola 2, from there transformed in a gearbox 7 and transferred into the generator 3 via a shaft 8. The gearbox 7 is used to convert the slow rotation of the rotor blades 5 into a rapid rotation of the generator shaft 8, which is suitable to produce sufficient power in the generator 3. Also arranged in the turbine 1, among other things, are a wide range of bearings and braking systems (not illustrated), which are able to slow or stop the rotation of the shafts 6, 8 and components not illustrated further. In addition, the rotor blades 5 are configured to be rotatably mounted via bearings and, as a result, can be adapted to the flow direction and rotated such that the flow does not cause any rotation.

The bearings themselves and also the generator 3 and the gearbox 7 are usually lubricated with oil. In order to monitor the operation of the turbine, in particular the rotation of the shaft 6, 8, of the gearbox 7 and of the generator 3 but also the setting of the rotor blades 5, electronic components (not illustrated), which are relatively sensitive, are also provided.

In order to monitor and maintain all these components, a maintenance hatch 9 (or access hatch) is also provided on the gondola 2 and a maintenance hatch 9' on the hub 4, permitting access to the interior 20 of the gondola and to the interior 40 of the hub 4. The interiors 20 and 40 are sealed off hermetically in order to prevent the penetration of water in underwater operation.

During the operation of the turbine 1, because they are sealed off with respect to the outer environment, toxic gases, moisture, oil vapor and salt-containing air, which have a detrimental influence on the sensitive components such as electronics, slip rings or similar parts, accumulate in the interiors 20; 40 of the gondola 2 and the hub 4. This can lead to unplanned outage times and to the maintenance intervals having to be shortened. The air composition produced in the interiors 20; 40 during operation also leads to a maintenance person not being able to enter the interior 20; 40 of gondola 2 or hub 4 at any time without having first ensured that the air composition is suitable for safe entry and, in the event that it is not suitable, having to ensure aeration and ventilation of the gondola 2 or the hub 4, which in turn is time-consuming.

In order to actively permit an air exchange and to ensure that the interior 20; 40 can be entered by a person without risk, within the context of this application it is proposed to install a ventilation system 50 in the interiors 20; 40. For this purpose, as can be gathered in the exemplary embodiment of FIG. 1, a air handling device 51 (e.g., a ventilation device and/or an air filtration device) can be provided in the interior 20 or 40 of gondola 2 or hub 4, being designed to convey air from the interior 20 or 40 to the outside through the maintenance hatch 9 or 9'. In the exemplary embodiment illustrated, the air handling device 51 is tubular and has an inlet opening 52 and an outlet opening 53, and an interior 54 in which a first fan 55 and a second fan 56 are arranged. The fans 55, 56 ensure that air is sucked out of the gondola interior 20 (see arrows) into the air handling device 51 and is discharged into the environment via the outlet opening 53 and through the maintenance hatch 9 or 9' (see arrows). As a result of the negative pressure that is produced thereby in the interior 20 of the gondola 2, fresh air from the outside then flows into the interior 20 (see arrows). As can further be gathered from FIG. 1, the inlet opening 52 faces the interior 20 for this purpose, while the outlet opening 53 is oriented in such a way that the air from the interior 20 can flow into the outside environment through the maintenance hatch 9, 9'.

In order to activate the air handling device 51, the ventilation system 50 also has a control device 60 with a control unit and a transmitting and receiving unit 62, via which, for example, it can receive a signal 66 which is output by an external operating element 68. In the exemplary embodiment illustrated, the control device 60 is further connected via a line 64 to the air handling device 50 in order, when the signal 66 is received, to transmit a corresponding activation signal to the air handling device 51 and to activate the latter. To ensure that the air present in the interior 20 is suitable for an operator to enter, a sensor device 70 is also provided, which is designed to determine a condition or a condition variable of the medium present in the interior 20, specifically the air, or to analyze the composition overall. The analytical values can in turn be transmitted via a line 72 to the control device 60, although cable-free translation is also possible. The sensor device 70 preferably likewise has a transmitting and receiving unit (not illustrated). The sensor device 70 can also comprise a control unit.

With the aid of the values from the sensor device, it is possible to establish in the sensor device 70, the control device 60 or an external evaluation unit whether those values have fallen above or below limiting values, which are preferably determined in advance, for specific components of the air. On this basis, the sensor device 70 can transmit corresponding signals. Of course, it is alternatively also possible that such an evaluation of the sensor signals is performed in the control device 60 or externally by an operator (not illustrated), which or who then activates or deactivates the air handling device 51 accordingly via the external interface 68 with the aid of the control device 60. If the sensor unit 70 or the control device 60 or the operator determines that safe access is possible k, the valve device 51 can also be deactivated with the aid of the control panel 68 and the control unit 60.

In order to achieve more targeted extraction of the air and also to dispose of air directly at highly contaminated locations, provision can also be made and, as illustrated in FIGS. 3A, 3B, for one or more conduits 57 to be provided, which remove air specifically from the interior 20; 40. For example, the air handling device 51 can be arranged at a point far removed from the maintenance hatch 9, 9' and suck air into the ventilation inlet opening 52 at that point. The air sucked in is then transported via the conduit 57 in the direction of the maintenance hatch 9, 9' and deliberately blown off into the open there. The conduit 57 has the further advantage that it can lead to less re-contamination as a result of mixing between air flowing in and air flowing out. Furthermore, it is possible to connect further devices at the end of the conduit 57, such as a further conduit to carry away the used air still further, or one or more air cleaning devices in order to ensure that the used air does not contaminate the environment. Of course, it is also possible that one or more conduits (not illustrated) are arranged at the inlet opening 52, which are deliberately laid in the interior 20; 40 in order to ventilate particularly highly contaminated points. Also provided in this exemplary embodiment are a sensor device 70 and a control device 60, which ensure activation and deactivation and checking of the condition of the air.

Figure 4B:
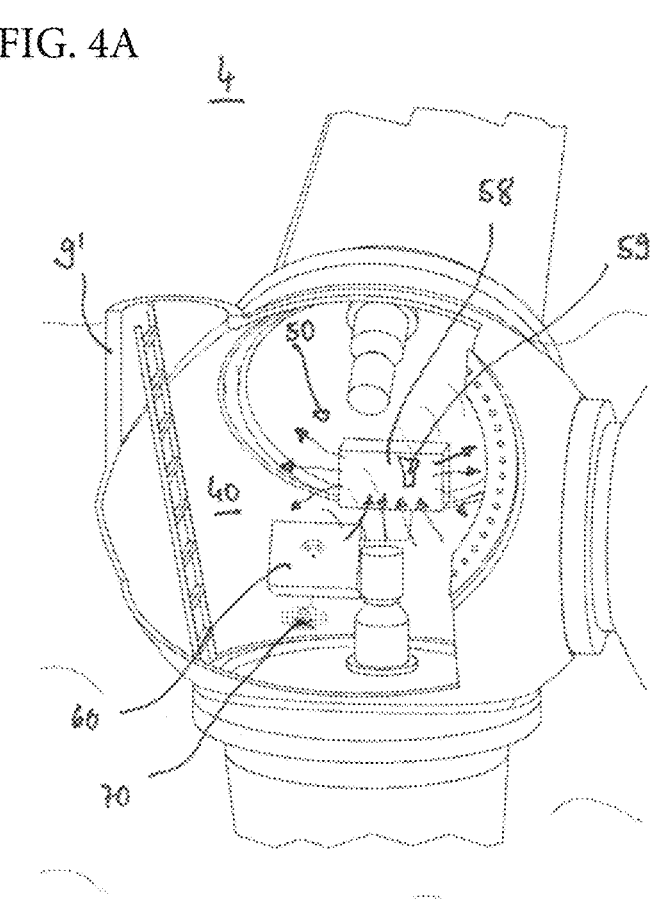
FIG. 4B is a schematic illustration of a third exemplary embodiment of a ventilation system for an underwater turbine in a hub.

FIGS. 4A, 4B in turn show an exemplary embodiment for an aeration system in the gondola 2 and hub 4 but in which there is no exchange of air with the external environment, instead the ventilation system 50 is equipped with an air cleaning device 58, which includes one or more filtration devices 59, which ensures that contaminated air is sucked in and cleaned air is expelled. This is advantageous in particular in underwater use, in which a supply of fresh air is not possible. With the aid of chemical and/or mechanical filters, the air filter unit 59 ensures that pollutants, toxic gases and particles are filtered out of the air and cleaned air is discharged into the interior 20; 40. In this case, too, a sensor 70 and a control device 60 which check whether and to what extent the air must be cleaned or whether the cleaning is successful are of advantage. For this purpose, for example the sensor device and the control device 70 can in turn communicate with each other in order to actuate the air cleaning device 58 appropriately on demand. Of course, it is likewise possible that the air cleaning device 58 is activated and deactivated via an external control system and/or that sensor data can be read out.

Of course, it is likewise possible to combine the air cleaning device 58 with the air handling device 51 and, in closed operation, to ensure only circulation of the air and cleaning of the air, while the interior is additionally aerated with fresh air shortly before entry for maintenance.

Overall, the ventilation systems for the gondola and hub can be conceived either for continuous operation or for the maintenance mode. The aeration concepts are based prefer- ably either on air cleaning, aeration with conduits and/or suction/blower ventilation. Preferably, all the ventilation systems are equipped with a sensor unit, a control device and wire-free control for remote access, monitoring and condi- tion monitoring and make it possible that ventilation systems additionally introduced into the gondola and hub during the maintenance are superfluous, and also that active air content measurement is no longer necessary during the maintenance. Furthermore, with the aid of the sensor device, safe access of the maintenance personnel can be ensured. Likewise with the aid of the sensor device, condition monitoring can also be carried out during operation and, if necessary, activation of the air filter unit, in order to ensure the most contamina- tion-free operation and therefore low-emission operation.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Further- more, each of the additional features and teachings disclosed above may be utilized separately or in conjunction with other features and teachings to provide improved underwater turbines.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodi- ments of the present teachings.

All features disclosed in the description and/or the claims are intended to be disclosed separately and independently from each other for the purpose of original written disclo- sure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written dis- closure, as well as for the purpose of restricting the claimed subject matter.

LIST OF REFERENCE SYMBOLS

1 Flow turbine
2 Gondola
3 Generator
4 Hub

5 Rotor blades
6, 8 Shaft
7 Gearbox
9, 9' Maintenance hatches
20, 40 Interior
50 Ventilation system
51 Ventilation device
52 Inlet opening
53 Outlet opening
54 Interior
55,56 Fans
57 Conduits
58 Air cleaning device
59 Filter devices, air filter unit
60 Control device
62 Transmitting and receiving unit
64 Line
66 Signal
68 External operating element
70 Sensor device
72 Line

What is claimed is:

1. An underwater flow turbine comprising:
a gondola having an interior and a hermetically sealable access hatch, the access hatch providing fluid commu- nication between the interior and an ambient atmo- sphere outside the gondola,
a generator in the gondola interior,
a rotatable hub connected to the gondola and configured to support a plurality of rotor blades, the rotatable hub being operatively connected to the generator, and
an air handling device in the gondola,
wherein the air handling device has an inlet in the interior and an outlet facing away from the inlet and into the access hatch, and
wherein the air handling device is configured to direct a flow of air through the access hatch and into the ambient atmosphere.

2. The flow turbine according to claim 1,
wherein the air handling device comprises a fan, and
wherein a conduit extends from the fan to the access hatch.

3. The flow turbine according to claim 1,
wherein the air handling device includes a chemical air filter and/or a mechanical filter.

4. The flow turbine according to claim 1, including:
a ladder leading from the access hatch into the interior,
wherein the outlet of the air handling device is arranged adjacent to the access hatch, and
wherein the ladder is spaced from the outlet so as to allow a worker to enter the interior via the ladder.

5. The flow turbine according to claim 1,
including a sensor configured to determine at least one condition of a gaseous medium present in the gondola.

6. The flow turbine according to claim 5,
wherein the sensor is configured to analyze a composition of the gaseous medium.

7. The flow turbine according to claim 5,
wherein the sensor includes a transceiver configured to transmit a signal indicative of the at least one condition and receive a control signal configured to activate and/or deactivate the sensor.

8. The flow turbine according to claim 5,
including a control unit configured to activate and/or deactivate the air handling device based on an output of the sensor.

9. The flow turbine according to claim 8,
wherein the control unit is configured to evaluate information received from the sensor and to activate and/or deactivate the air handling device when information indicates that the at least one condition is above or below a predetermined value.

10. The flow turbine according to claim 1,
wherein the access hatch and the air handling device are configured such that directing the flow of air through the access hatch and into the ambient atmosphere draws air from the ambient atmosphere into the interior via the access hatch.

11. An underwater flow turbine comprising:
a gondola having an interior and a hermetically sealable access hatch, the access hatch providing fluid communication between the interior and an ambient atmosphere outside the gondola,
a generator in the gondola interior,
a rotatable hub connected to the gondola and configured to support a plurality of rotor blades, the rotatable hub being operatively connected to the generator, and
an air handling device in the hub,
wherein the air handling device has an inlet in the interior and an outlet facing away from the inlet and into the access hatch, and
wherein the air handling device is configured to direct a flow of air through the access hatch and into the ambient atmosphere.

12. The flow turbine according to claim 11,
wherein the air handling device comprises a fan, and wherein a conduit extends from the fan to the outlet.

13. The flow turbine according to claim 11,
wherein the air handling device includes an air filtration device.

14. The flow turbine according to claim 13,
wherein the air filtration device includes a chemical air filter and/or a mechanical filter.

15. The flow turbine according to claim 11,
including a sensor configured to determine at least one condition of a gaseous medium present in the hub.

16. The flow turbine according to claim 15,
wherein the sensor is configured to analyze a composition of the gaseous medium.

17. The flow turbine according to claim 11,
wherein the access hatch and the air handling device are configured such that directing the flow of air through the access hatch and into the ambient atmosphere draws air from the ambient atmosphere into the interior via the access hatch.

18. An underwater flow turbine comprising:
a gondola having an interior,
a generator in the gondola interior,
a rotatable hub connected to the gondola and configured to support a plurality of rotor blades, the rotatable hub being operatively connected to the generator,
an air handling device in the gondola and/or in the hub,
a sensor configured to determine at least one condition of a gaseous medium present in the gondola and/or the hub, and
a control unit configured to activate and/or deactivate the air handling device in response to a control signal.

* * * * *